(12) United States Patent
Heuberger

(10) Patent No.: US 7,726,931 B2
(45) Date of Patent: Jun. 1, 2010

(54) ROTARY LIFT TABLE

(75) Inventor: Werner Heuberger, Bäretswil (CH)

(73) Assignee: Ferag AG, Hinwil (CH)

( * ) Notice: Subject to any disclaimer, the term of this patent is extended or adjusted under 35 U.S.C. 154(b) by 460 days.

(21) Appl. No.: 11/743,908

(22) Filed: May 3, 2007

(65) Prior Publication Data

US 2007/0257420 A1 Nov. 8, 2007

(30) Foreign Application Priority Data

May 5, 2006 (CH) .................................... 0727/06

(51) Int. Cl.
*B65G 57/22* (2006.01)
(52) U.S. Cl. .................................... 414/792.3; 271/213
(58) Field of Classification Search ................. 271/108, 271/209, 213; 414/791.5–791.9, 792–792.4; 83/89, 90
See application file for complete search history.

(56) References Cited

U.S. PATENT DOCUMENTS

| 3,761,080 | A | * | 9/1973 | Larson ........................ 271/209 |
| 4,068,567 | A | | 1/1978 | Allison et al. |
| 4,358,285 | A | * | 11/1982 | Fujino ........................ 493/411 |
| 5,074,836 | A | * | 12/1991 | Fechner et al. .............. 493/411 |
| 5,092,236 | A | * | 3/1992 | Prim et al. .................. 100/220 |
| 5,387,077 | A | * | 2/1995 | Yatsuka et al. .............. 414/791 |
| 5,434,660 | A | * | 7/1995 | Yoshida et al. .............. 399/367 |
| 7,192,028 | B2 | | 3/2007 | Kramer |
| 2004/0140607 | A1 | | 7/2004 | Honegger |

FOREIGN PATENT DOCUMENTS

| EP | 0 348 610 A2 | 1/1990 |
| EP | 1 253 098 A1 | 10/2002 |
| EP | 1 445 224 A1 | 8/2004 |

OTHER PUBLICATIONS

Search report for Swiss Application No. CH 7272006, dated Aug. 25, 2006.

* cited by examiner

*Primary Examiner*—Gregory W Adams
(74) *Attorney, Agent, or Firm*—Alston & Bird LLP

(57) ABSTRACT

A rotary lift table. The rotary lift table as claimed in the invention is equipped with a rotary lift table board for bearing flat objects, said rotary lift table board having a bearing surface which is pulvinated towards the top with a transverse ridge region whose longitudinal extension runs at least approximately at a right angle to a discharge direction. The flat objects lying on top of one another in a stack arrangement are adapted to the arched bearing surface and give the stack improved stability thanks to its profiling.

21 Claims, 3 Drawing Sheets

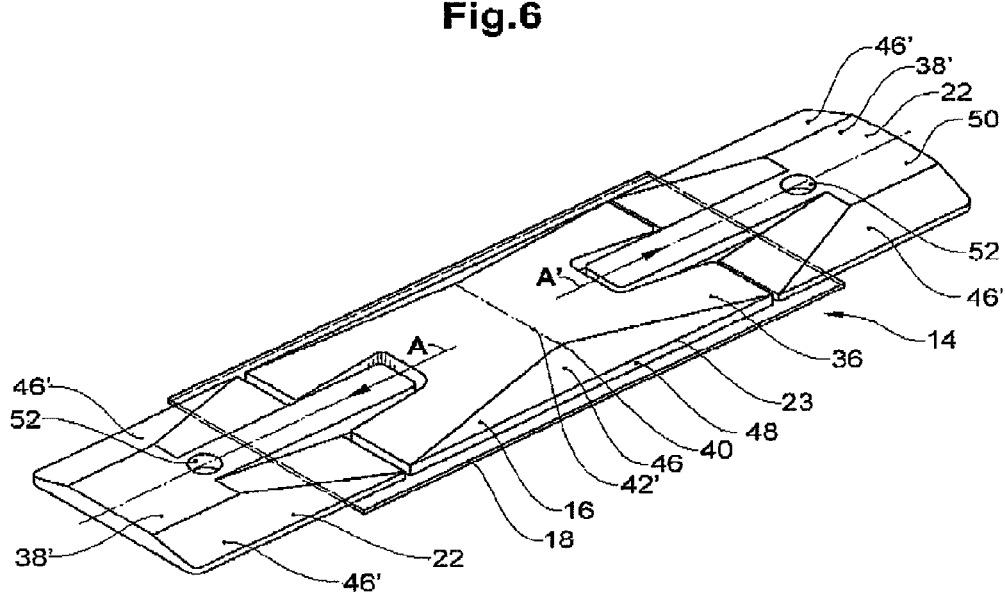
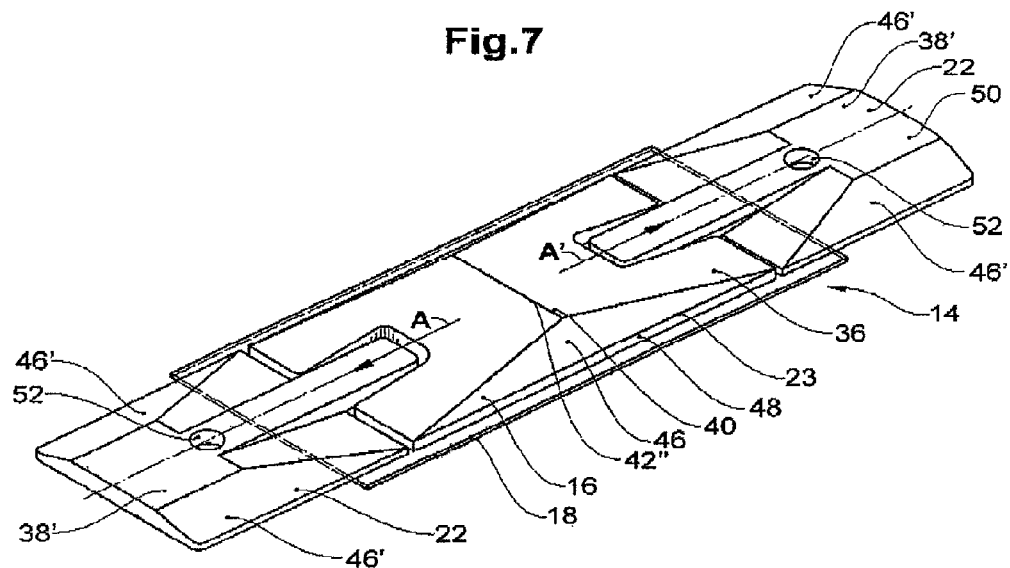

ROTARY LIFT TABLE

BACKGROUND OF THE INVENTION

The present invention relates to a rotary lift table and a device for forming stacks of flat objects, in particular of print products.

Rotary lift tables for processing flat objects, in particular print products such as printed leaflets, newspapers, magazines, etc., are generally known. They are equipped with a rotatable and/or liftable and lowerable rotary lift table board on or above which the flat objects come to lie. Rotary lift tables generally have assigned discharge means, by means of which the flat objects lying on the rotary lift table board can be pushed out in a selected discharge direction.

The rotatability of the rotary lift table board is particularly advantageous in the formation of stacks of folded print products. To improve the stability of such stacks, partial stacks respectively rotated in relation to one another by 180° relative to a rotational axis oriented at a right angle to the rotary lift table board are layered alternately on top of one another. In this manner, thicker regions on the fold side and thinner regions of the free lateral edges of print products of consecutive partial stacks respectively come to lie on top of one another in an alternating manner so that height differences between the individual partial stacks are equalized due to their regionally different thicknesses.

The rotary lift table board is furthermore preferably of liftable and lowerable design in order, for example, to selectively reduce heights of fall for print products or partial stacks formed therefrom or, for the purpose of compressing stacks, in order to be able to press these against press elements arranged above the rotary lift table board.

The configuration both of the rotatability as well as the liftability and lowerability of the rotary lift table board is not absolutely essential in every case. Rather, the rotary lift table described and claimed below can also be employed in a completely analogous manner with a restricted functionality, i.e. in the case of use as a rotary table, lift table or also only as a stacking table.

A rotary table for stacking print products is, for example, described in U.S. Pat. No. 4,068,567. Therein, a rotary table board is arranged on a hydro-pneumatic rotatable foot, said rotary table board being equipped on two opposing sides with discharge devices which have discharge means for discharging the print products arranged in stacks. Therein, a movement of the discharge means beyond the rotary table board and displacing the print products defines a discharge direction. The rotary table board is groove-like or arched in a V-shape towards the bottom. Planar bearing surface elements, on which a lower print product comes to lie, are formed on both sides of a lower edge line running parallel to the discharge direction. The print products lying on the rotary table board are adapted to the concave arch of the rotary table board due to their surface-like configuration and their dead weight.

The problem arises particularly in the case of large-format and very thin print products that the dimensional stability of stacks of such print products is so low during discharge that undesirable dimensional changes to the stack and damage to the print products can occur.

An object of the present invention therefore lies in further improving the dimensional stability of stacks of flat objects during their formation or their removal from a rotary lift table.

SUMMARY OF THE INVENTION

This object and others are achieved by providing a rotary lift table with a rotary lift table board for bearing flat objects, in particular print products, comprising an arched bearing surface which is formed by at least one bearing surface element and from which the flat objects can be removed in a discharge direction, wherein the bearing surface is pulvinated towards the top and has a ridge region referred to as the transverse ridge region whose longitudinal extension runs at least approximately at a right angle to the discharge direction. The present invention also provides a device for forming stacks of flat objects, in particular of print products, comprising a stacking shaft which is delimited at the bottom by the rotary lift table board of a rotary lift table as described above, further having rotary means for rotating the rotary lift table, lifting means for lifting and lowering the rotary lift table, discharge means for discharging the flat objects from the stacking shaft in the discharge direction and preferably a partial stacking device arranged above the stacking shaft, said partial stacking device being intended to form partial stacks of flat objects and discharge these partial stacks into the stacking shaft.

The rotary lift table as claimed in the invention is equipped with a rotary lift table board for bearing flat objects, in particular print products, said rotary lift table board having a bearing surface which is pulvinated towards the top. The bearing surface is formed by bearing surface elements and is equipped with a ridge region whose longitudinal extension runs at least approximately at a right angle to a discharge direction in which the flat objects can be removed from the rotary lift table board. This ridge region is consequently referred to as the transverse ridge region.

Flat objects which come to bear on or above the rotary lift table board adapt essentially to the convex transverse arching of the rotary lift table board or flat objects already lying thereon and therein experience a corresponding profiling. This profiling of the flat objects brings about improved dimensional stability of the stack lying on the rotary lift table board, which is particularly advantageous during rotation of the rotary lift table board and during discharge of the stack since, in this manner, the risk of slipping or toppling of the stack and thus any damage to the flat objects is reduced. Moreover, the pulvinated bearing surface is particularly useful in the case of flat objects provided with a fold for improved centering of the flat objects in their stack arrangement.

BRIEF DESCRIPTION OF THE DRAWINGS

Figure 1:
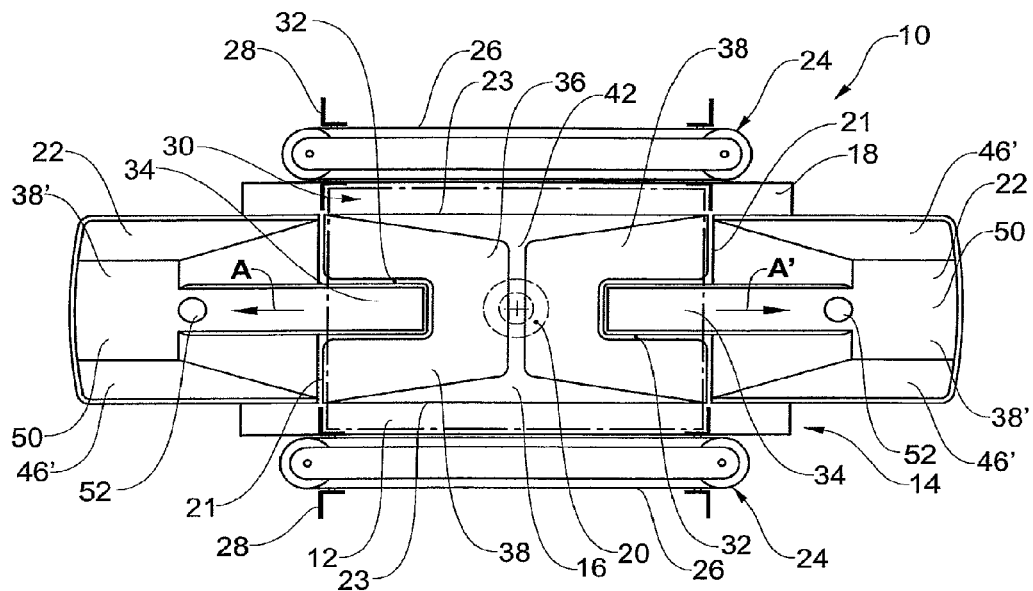
Figure 2:
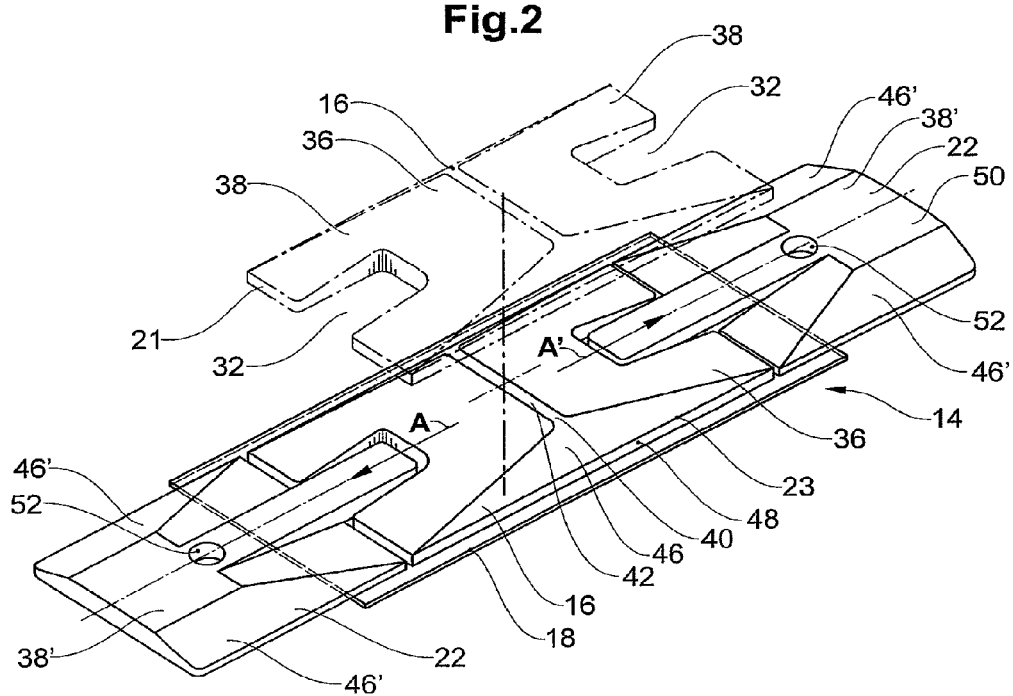
Figure 3:
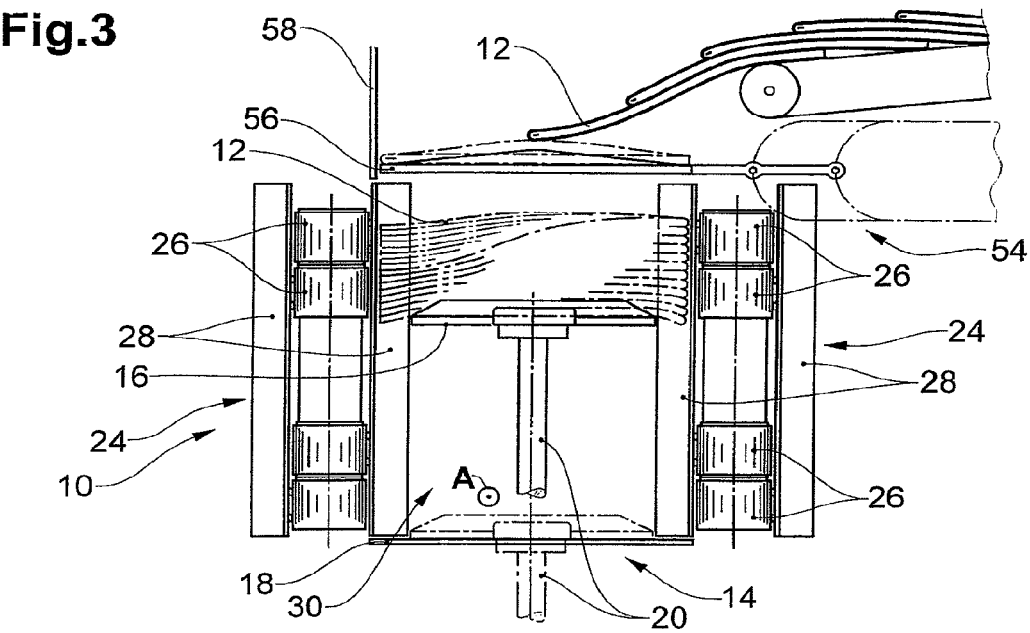
Figure 4:
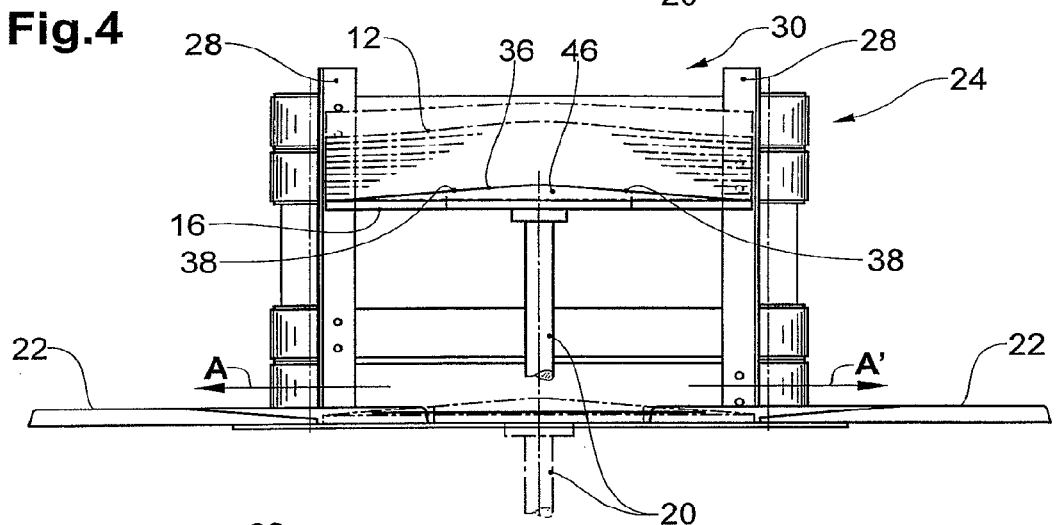
Figure 5:
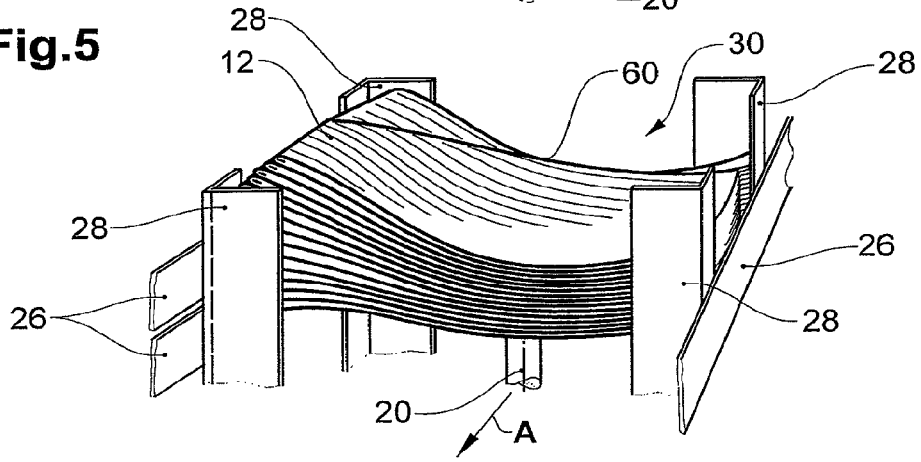

Having thus described the invention in general terms, reference will now be made to the accompanying drawings, which are not necessarily drawn to scale, and wherein:

FIG. 1 shows a top view of a device in accordance with one embodiment of the present invention for forming stacks of flat objects with a rotary lift table which has a rotary lift table board which is pulvinated towards the top in a hipped roof-shaped manner, wherein two auxiliary tables are assigned to said rotary lift table board;

FIG. 2 shows a perspective view of the rotary lift table board shown in FIG. 1 in a lower base position (continuous lines), in which it engages with the assigned auxiliary tables, and in a raised lift position (dot-dash lines);

FIG. 3 shows a front view of the stacking device shown in FIG. 1, in which the print products are supplied to a partial stacking device in a chadless formation above a stacking shaft and the rotary lift table board is shown with print products lying thereon in a raised lift position (continuous line) and in a lower base position (dot-dash lines);

FIG. 4 shows a side view of a part of the stacking device shown in FIG. 1 and FIG. 3, wherein in turn the rotary lift table board is shown in a raised lift position with print products lying thereon (continuous lines) and unloaded in a lower base position (dot-dash lines);

FIG. 5 shows a perspective view of an upper region of the stacking shaft which is filled with a partial stack of print products which lie on the rotary lift table board as claimed in the invention and wherein the print products have adapted approximately to the arch of the rotary lift table board lying thereunder.

FIG. 6 shows a perspective view of a preferred embodiment of the rotary lift table board with a transverse ridge region which is rounded;

FIG. 7 shows a perspective view of another preferred embodiment of the rotary lift table board with a transverse ridge region forming an edge.

DETAILED DESCRIPTION OF THE INVENTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

Stacking device 10 as claimed in the invention shown in FIG. 1 for flat objects, in particular for print products 12 such as magazines, newspapers, paper sheets, etc., has a rotary lift table 14 as claimed in the invention with a rotary lift table board 16 which is intended for storing print products 12. Rotary lift table board 16 is arranged above a planar base plate 18 in a manner that it can be lifted and lowered and is centrally mounted on a rotary lift cylinder 20 shown by dot-dash lines in FIG. 1. Rotary lift cylinder 20 is part of a lifting means which is preferably operated electrically, hydraulically or pneumatically.

An auxiliary table 22 is respectively arranged on both sides of shorter, opposing broad sides 21 of rotary lift table board 16. Auxiliary tables 22 extend rotary lift table board 16 and, together with two discharge devices 24 arranged on opposing longitudinal sides 23 of rotary lift table board 16, define two discharge directions A and A'. The discharge of the print products is possible in both discharge directions A or A', i.e. both discharge direction A and discharge direction A' can be freely selected.

Discharge devices 24 are, for example, described in detail in EP-A-1445224. They are equipped with discharge means fastened on transport means 26 in the form of angle profiles 28. Angle profiles 28 define a stacking shaft 30 which is restricted at the bottom by rotary lift table board 16 and within which stacks are formed by the supply of print products 12. In order to discharge print products 12 then arranged in a stack, angle profiles 28 are moved in discharge direction A or A' and the stacks are pushed via an assigned auxiliary table 22 to a removal device, not shown, for example, a conveyor belt or a roller conveyor.

It is apparent from FIG. 1 that rotary lift table board 16 is formed essentially in an H-shape in a top view. It is provided on broad sides 21 respectively with rectangular jaw recesses 32 which are open in or counter to discharge direction A or A' respectively. In a lower base position of rotary lift table board 16, tongue-like ramp elements 34 of assigned auxiliary tables 22 respectively engage in jaw recesses 32.

The configuration as claimed in the invention of rotary lift table board 16 and assigned auxiliary tables 22 are particularly clear in the perspective view of FIG. 2. Rotary lift table board 16 has a bearing surface 36 which is pulvinated towards the top and is essentially formed by two at least approximately planar bearing surface elements 38. Bearing surface elements 38 which are essentially U-shaped due to jaw recesses 32 are formed in mirror symmetry to one another and are at an angle to one another while forming essentially gable roof-like bearing surface 36. Surface normals which can be found on bearing surface elements 38 enclose an angle between 5 and 20°, preferably of 15°.

The topmost region of bearing surface 36 forms what is referred to as a ridge region 40. Due to the fact that the longitudinal extension of ridge region 40 runs approximately at a right angle to discharge direction A or A', it is also referred to as transverse ridge region 42. In the shown embodiment, transverse ridge region 42 is flattened. Alternatively, it can, for example, also be rounded 42' or form an edge 42".

In mirror symmetry relative to discharge direction A, rotary lift table board 16 is equipped on longitudinal sides 23 with essentially triangular further bearing surface segments 46. Bearing surface elements 38 and further bearing surface segments 46 jointly form a specific configuration of a gable roof-shaped bearing surface 36, namely a hipped roof-like bearing surface 36.

Further bearing surface segments 46 are arranged at an angle to one another such that surface normals found on them enclose angles between 50 and 90°, preferably of 75°. Alternatively, it is also conceivable to do away entirely with further bearing surface segments 46, as a result of which a purely gable roof-like bearing surface 36 would then remain. Further bearing surface segments 46 of almost equal size form essentially isosceles triangles whose lower segment edges 48 form parts of longitudinal sides 23 and run parallel to discharge direction A or A'. Their corners opposite lower segment edges 48 delimit transverse ridge region 42 in its transverse extension.

Rotary lift table board 16 is also shown in FIG. 2 by dot-dash lines in a raised lift position. In this lift position, both assigned auxiliary tables 22 are no longer engaged via their tongue-like ramp elements 34 with jaw recesses 32.

Auxiliary tables 22 can be arranged both fixedly on base plate 18 and as a result co-rotating during a rotation of rotary lift table 14 as well as stationary in relation to rotary lift table 14, i.e. not co-rotating. In the latter case, before a rotation of rotary lift table board 16, this must first be raised until tongue-like ramp elements 34 are no longer engaged with jaw recesses 32.

Auxiliary tables 22 are equipped with a platform-like elevation 50 which is formed by an upper, essentially horizontally running bearing surface element 38' and further lateral bearing surface elements 46' running at an angle thereto. Upper bearing surface element 38' also encompasses the surface of tongue-like ramp element 34. Therein, the height of platform-like elevation 50 is selected so that, in the lower base position of rotary lift table board 16 in which print products 12 can be pushed down out of stacking shaft 30 and thus from rotary lift table board 16, is less than the height of transverse ridge region 42, 42', 42". In this manner, print products 12 can be slid onto upper bearing surface element 38' during discharge across the surface of tongue-like ramp element 34.

Auxiliary tables 22 are fastened via bores, of which countersinks 52 are visible in FIG. 2, on rotary lift table 14 or a stationary holding element.

In the case of the particularly preferred embodiment as shown in FIG. 1 and FIG. 2, auxiliary tables 22 are arranged respectively on both sides on broad sides 21 of rotary lift table board 16. These extend rotary lift table board 16 down to the downstream removal device (not shown), by means of which print products 12 or stacks of print products 12 are then removed. Alternatively, rotary lift table 14 can also only be equipped with one or no auxiliary table 22. The embodiment with two auxiliary tables 22 is particularly advantageous if print products 12 can be pushed onto only one removal device irrespective of the rotational position of rotary lift table board 16 via auxiliary tables 22 both in and counter to discharge direction A or A'.

Stacking device 10 as claimed in the invention is shown in FIG. 3 with rotary lift table 14 as claimed in the invention in a front view looking counter to discharge direction A. As already mentioned, stacking shaft 30 is laterally delimited respectively by angle profiles 28, which are fastened on transport means 26 of discharge device 24, and delimited at the bottom by rotary lift table board 16. Rotary lift table board 16 is located in a raised lift position (continuous lines) and is already loaded with a partial stack of print products 12. Rotary lift table board 16 is indicated in its lower base position by dot-dash lines.

A partial stacking device 54 is arranged above stacking shaft 30. Partial stacking device 54 is equipped with a preferably fork- or slide-like intermediate base 56 on which a previously determined number of print products 12 first come to form a partial stack. Print products 12 are, for this purpose, supplied by a supply transport device, for example, a conveyor belt, preferably in a chadless formation to intermediate base 56 from above. The correct storage position of print products 12 on intermediate base 56 is ensured by a stop 58 arranged above stacking shaft 30.

Once the predetermined number of print products 12 for forming a partial stack has been reached, intermediate base 56 is guided through between two angle profiles 28 such that print products 12 of the partial stack are removed at angle profiles 28 and fall in stacking shaft 30 onto rotary lift table board 16 or onto a partial stack already lying thereon.

Preferably, after each loading of rotary lift table board 16 with a further partial stack of print products 12, rotary lift table board 16 is, as described above, rotated by 180° so that regions on the fold side of print products 12 of the newly supplied partial stack respectively come to lie above open lateral edges of print products 12 of the existing partial stack lying thereunder.

As shown in FIG. 4, print products 12, when they lie on rotary lift table board 16, adopt essentially the form of bearing surface 36 which is pulvinated towards the top. Therein, on the one hand, they are centered and, on the other, stabilized in their stack form. FIG. 5 shows a perspective view of stacking shaft 30 with a partial stack already lying on rotary lift table board 16. Thanks to the hipped roof-like formation of bearing surface 36, print products 12 also obtain a profiling at least similar to bearing surface 36.

The formation of an upper transverse arch edge 60 in the case of print products 12 is caused by transverse ridge region 42, 42', 42''. From its transverse arch edge 60, print products 12 spread out on both sides in a wing-like/curved manner. Due to the fact that print products 12 already have greater dimensional stability on the fold side thanks to their folding profile in comparison with the opposite free lateral edges, print products 12 lying on rotary lift table board 16 experience a slight transverse arching on the fold side.

As a result of the three-dimensional profiling of print products 12 with a transverse arch edge 60, the stability of the stacks is improved so that these can be pushed out of stacking shaft 30 with fewer or better controlled dimensional changes.

When discharging or pushing out the stack, transverse ridge region 42, 42', 42'' can be overcome without any problems due to the moderate inclination of bearing surfaces 36 and the improved stability of the profiled stacks.

As soon as the stacks move from rotary lift table board 16 onto one of auxiliary tables 22, a longitudinal arch edge running in discharge direction A or A' is thus imposed on print products 12 instead of transverse arch edge 60 by sliding onto tongue-like ramp element 34 or entire upper bearing surface element 38' of platform-like elevation 50.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A rotary lift table with a rotary lift table board for bearing flat objects, in particular print products, comprising an arched bearing surface which is formed by at least one bearing surface element and from which the flat objects can be removed in a discharge direction, wherein the bearing surface is pulvinated towards the top and has a ridge region referred to as the transverse ridge region whose longitudinal extension runs at least approximately at a right angle to the discharge direction, wherein two substantially planar bearing surface elements at an angle to one another form a gable roof-like bearing surface whose roof ridge forms the transverse ridge region, and wherein two substantially triangular further bearing surface segments are formed additionally on the lateral outside and running substantially parallel to the discharge direction in order to form a bearing surface which is essentially hipped roof-like in its entirety, wherein the further bearing surface elements form substantially isosceles triangles of preferably equal size, their lower segment edges respectively run essentially parallel to the discharge direction and their corners opposite the lower segment edges delimit the transverse ridge region on both sides.

2. The rotary lift table as claimed in claim 1, wherein surface normals on the bearing surface elements at an angle to one another enclose an angle between 5° and 20°.

3. The rotary lift table as claimed in claim 2, wherein surface normals on the bearing surface elements at an angle to one another enclose an angle of approximately 15°.

4. The rotary lift table as claimed in claim 1, wherein surface normals on the further bearing surface elements at an angle to one another enclose an angle between 50° and 90°.

5. The rotary lift table as claimed in claim 4, wherein surface normals on the further bearing surface elements at an angle to one another enclose an angle of approximately 75°.

6. The rotary lift table as claimed in claim 1, wherein the transverse ridge region is flattened, or is rounded or forms an edge.

7. The rotary lift table as claimed in claim 1, wherein the rotary lift table board has an outer jaw recess which is preferably at least approximately rectangular in a top view, is open in the discharge direction and can receive a tongue-like ramp element of an assigned auxiliary table.

8. A rotary lift table with a rotary lift table board for bearing flat objects, in particular print products, comprising an arched bearing surface which is formed by at least one bearing surface element and from which the flat objects can be removed in a discharge direction, wherein the bearing surface is pulvinated towards the top and has a ridge region referred to as the transverse ridge region whose longitudinal extension runs at least approximately at a right angle to the discharge direction, wherein the rotary lift table board has an outer jaw recess which is preferably at least approximately rectangular in a top view, is open in the discharge direction and can receive a tongue-like ramp element of an assigned auxiliary and wherein the auxiliary table has a platform-like elevation with a preferably planar, upper bearing surface element and further lateral bearing surface elements running at an angle to the upper bearing surface element, wherein the upper bearing surface element extends at least approximately horizontally at a height below the transverse ridge region of the rotary lift table board during a discharge of the flat objects.

9. A rotary lift table with a rotary lift table board for bearing flat objects, in particular print products, comprising an arched bearing surface which is formed by at least one bearing surface element and from which the flat objects can be removed in a discharge direction, wherein the bearing surface is pulvinated towards the top and has a ridge region referred to as the transverse ridge region whose longitudinal extension runs at least approximately at a right angle to the discharge direction, wherein the rotary lift table board has an outer jaw recess which is preferably at least approximately rectangular in a top view, is open in the discharge direction and can receive a tongue-like ramp element of an assigned auxiliary and wherein the auxiliary table is arranged co-rotating or stationary in relation to the rotary lift table board.

10. A device for forming stacks of flat objects, in particular of print products, comprising a stacking shaft which is delimited at the bottom by a rotary lift table board of a rotary lift table comprising an arched bearing surface which is formed by at least one bearing surface element and from which the flat objects can be removed in a discharge direction, wherein the bearing surface is pulvinated towards the top and has a ridge region referred to as the transverse ridge region whose longitudinal extension runs at least approximately at a right angle to the discharge direction, further having rotary means for rotating the rotary lift table, lifting means for lifting and lowering the rotary lift table and discharge means for discharging the flat objects from the stacking shaft in the discharge direction.

11. The device as claimed in claim 10, wherein two substantially planar bearing surface elements at an angle to one another form a gable roof-like bearing surface whose roof ridge forms the transverse ridge region.

12. The device as claimed in claim 11, wherein surface normals on the bearing surface elements at an angle to one another enclose an angle between 5° and 20°.

13. The device as claimed in claim 12, wherein surface normals on the bearing surface elements at an angle to one another enclose an angle of approximately 15°.

14. The device as claimed in claim 11, wherein two substantially triangular further bearing surface segments are formed additionally on the lateral outside and running substantially parallel to the discharge direction in order to form a bearing surface which is essentially hipped roof-like in its entirety, wherein the further bearing surface elements form substantially isosceles triangles of preferably equal size, their lower segment edges respectively run essentially parallel to the discharge direction and their corners opposite the lower segment edges delimit the transverse ridge region on both sides.

15. The device as claimed in claim 14, wherein surface normals on the further bearing surface elements at an angle to one another enclose an angle between 50° and 90°.

16. The device as claimed in claim 15, wherein surface normals on the further bearing surface elements at an angle to one another enclose an angle of approximately 75°.

17. The device as claimed in claim 11, wherein the transverse ridge region is flattened, or is rounded or forms an edge.

18. The device as claimed in claim 10, wherein the rotary lift table board has an outer jaw recess which is preferably at least approximately rectangular in a top view, is open in the discharge direction and can receive a tongue-like ramp element of an assigned auxiliary table.

19. The device as claimed in claim 18, wherein the auxiliary table has a platform-like elevation with a preferably planar, upper bearing surface element and further lateral bearing surface elements running at an angle to the upper bearing surface element, wherein the upper bearing surface element extends at least approximately horizontally at a height below the transverse ridge region of the rotary lift table board during a discharge of the flat objects.

20. The device as claimed in claim 18, wherein the auxiliary table is arranged co rotating or stationary in relation to the rotary lift table board.

21. The device as claimed in claim 10, wherein a partial stacking device is arranged above the stacking shaft, said partial stacking device being intended to form partial stacks of flat objects and discharge these partial stacks into the stacking shaft.

* * * * *

UNITED STATES PATENT AND TRADEMARK OFFICE
CERTIFICATE OF CORRECTION

| | | |
|---|---|---|
| PATENT NO. | : 7,726,931 B2 | Page 1 of 1 |
| APPLICATION NO. | : 11/743908 | |
| DATED | : June 1, 2010 | |
| INVENTOR(S) | : Heuberger | |

It is certified that error appears in the above-identified patent and that said Letters Patent is hereby corrected as shown below:

Column 7,

Lines 17 and 37, "auxiliary and" should read --auxiliary table, and--.

Signed and Sealed this
Thirtieth Day of August, 2011

David J. Kappos
*Director of the United States Patent and Trademark Office*